United States Patent [19]
Friis

[11] Patent Number: 5,462,153
[45] Date of Patent: Oct. 31, 1995

[54] CONTAINER HANDLING SYSTEM

[75] Inventor: Henrik Friis, Stenløse, Denmark

[73] Assignee: Tomra Systems A/S, Asker, Norway

[21] Appl. No.: 311,397

[22] Filed: Sep. 23, 1994

[51] Int. Cl.$^6$ ................................................ B65G 47/34
[52] U.S. Cl. ................................. 198/597; 198/347.2
[58] Field of Search ........................... 198/347.1, 347.2, 198/347.3, 597

[56] References Cited

U.S. PATENT DOCUMENTS

| 2,997,828 | 8/1961 | Ahlbor | 198/347.1 X |
| 3,854,611 | 12/1974 | Wahle | 198/347.1 X |
| 3,929,218 | 12/1975 | Risley | 198/597 X |
| 3,998,319 | 12/1976 | Memoe | 198/347.2 X |
| 4,042,094 | 8/1977 | Schmermund | 198/347.1 |
| 5,017,074 | 5/1991 | Fabbri | 198/453 X |

FOREIGN PATENT DOCUMENTS

| 3444462 | 6/1986 | Germany | 198/347.1 |
| 006015 | 3/1990 | Japan | 198/347.1 |

Primary Examiner—James R. Bidwell
Attorney, Agent, or Firm—Rodman & Rodman

[57] ABSTRACT

In a system comprising a reverse vending machine for empty liquid containers, such as e.g. empty beverage bottles, and a container collection table operatively connected with an outlet from the machine for collecting containers put into the machine by a customer and delivered out from the machine, a band extends between one longitudinal side region of the table and the other longitudinal region of the table. The band has an inherent rigidity enabling its faces to be substantially upright along the length thereof. The band is secured at one end thereof to one longitudinal side region. A roller is provided in an upright position at the other longitudinal side region for receiving the other end portion of an actuator operatively connected with the roller for winding or unwinding the end portion onto or from the roller, respectively. In the winding mode the containers are shifted substantially transversally of the table to one side thereof by virtue of the band being tensioned, and whereby in the unwinding mode the band is gradually pushed by containers delivered onto the table to lie substantially along the inner borderline of the table.

19 Claims, 2 Drawing Sheets

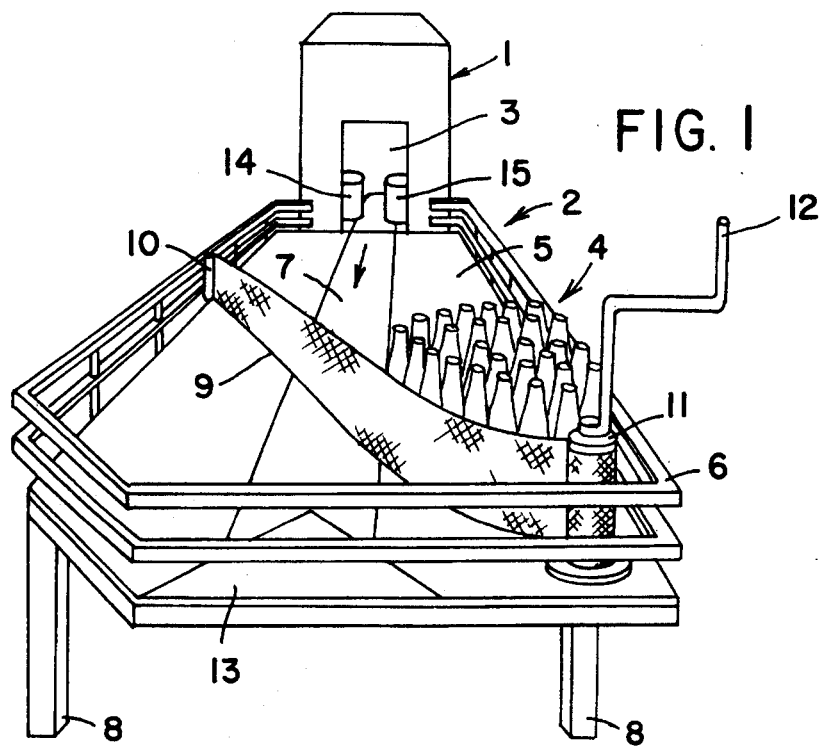
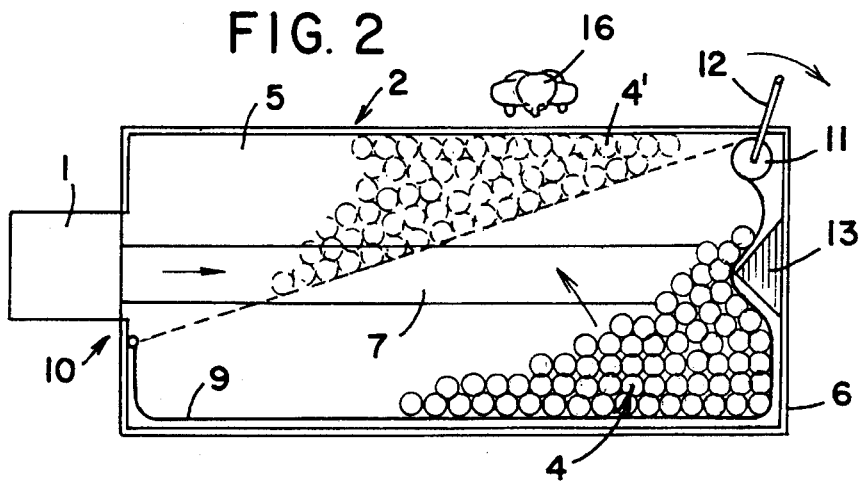
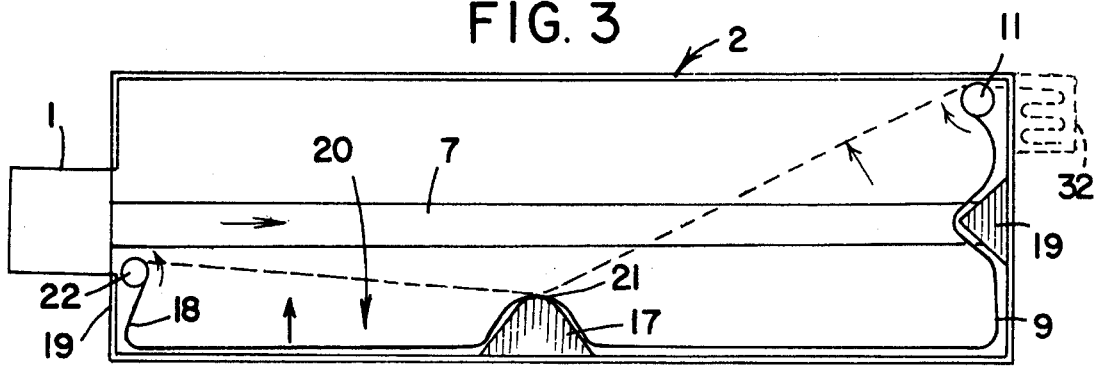

CONTAINER HANDLING SYSTEM

The present invention relates to a system comprising a reverse vending machine for empty liquid containers, such as e.g. empty beverage bottles, and a container collection table operatively connected with an outlet from said machine for collecting containers put into said machine by a customer and delivered out from said machine.

Apart from being relatively long, such collection tables are normally also quite wide, in the range of e.g. 1–2 meters wide. The liquid containers, e.g. bottles which are collected on the table are picked up by a person and put manually into suitable smaller collection units, such as liquid container crates.

A person standing alongside such collection table will normally have to bend over the table to reach those liquid containers which are at a position adjacent the other longitudinal side of the table. Such bending and stretching operation is uncomfortable and causes a harmful loading of the back of the person. The directorate of labour inspection in many countries have set regulations with respect to the operations which a person may carry out at such table.

In practice the person may either have to walk around the table to remove the collected liquid containers or use a grasping tool to pull the containers over to the side where the person stands. All such ways and means are impractical, and there has therefore long been a desire to obtain a simple means for pushing the liquid containers over to the side where the said person is located.

According to the present invention, the system recited in the introduction has the improvement wherein a band means extends between one longitudinal side region of said table and the other longitudinal region of said table, said band means having an inherent rigidity enabling its faces to be substantially upright along the length thereof, wherein means are provided for securing one end of said band means at one end thereof to said one longitudinal side region, wherein roller means is provided in an upright position at said other longitudinal side region for receiving the other end portion thereof, and wherein actuating means are provided, operatively connected with said roller means for winding or unwinding said end portion onto or from said roller means, respectively, whereby in the winding mode said containers are shifted substantially transversally of said table to one side thereof by virtue of said band means being tensioned, and whereby in the unwinding mode said band means is gradually pushed by containers delivered onto said table to lie substantially along the inner borderline of said table.

According to a further embodiment of the present invention, said table is provided with an endless conveyor belt extending in the longitudinal direction thereof, said two longitudinal side regions being located on either side of said belt.

However, it may be visualized, within the scope of the present invention as defined above and in the claims, that the use of an endless conveyor belt may be replaced or assisted by container push out means located at an outlet of said machine, such push out means e.g. being in the form of a pair of rollers of resilient material rotating in opposite directions in order to push containers squeezed between the rollers out from said machine and onto the collection table.

According to further embodiments of the invention, said table is at one or more positions along the borderline thereof provided with protrusion means extending into a container collection region on said table. Said protrusion means has preferably a substantially triangular horizontal cross section.

It is also within the scope of the invention to provide roller means at said protrusion means. Alternatively, said protrusion means can provide a sliding and supporting surface for said band means.

If the collection table is quite long, it may be advantageous once liquid containers have been moved across the container table by means of said band means, to move a group of liquid containers over to a midportion of the collection table in order that such group of liquid containers can be conveyed further along the collection table and finally be moved transversely again by means of said band means.

Thus, the present system provides a container collection bay between adjacent protrusion means, a bay band means being provided therebetween and movable from a position where it follows the bay walls and upon shortening thereof to a position extending over the mouth of the bay. Alternatively or in addition, a container collection bay is provided between a protrusion means and a wall portion of said table, bay band means being provided therebetween and movable from a position where it follows the bay walls and upon shortening thereof to a position extending over the mouth of the bay.

Said actuating means could be an electric motor or simply a manually operable crank.

In the case where the collection table is provided with a longitudinally extending conveyor belt, the level of said table along one longitudinal side of the conveyor belt should be flush with or slightly higher than the upper surface of the belt, and higher than the level along the other longitudinal side of said belt, in order that a liquid container being moved across the table does not abut the longitudinal side of the conveyor belt and is caused to tilt or overturn as a result thereof.

The type of band means could be any kind having the inherent rigidity enabling its faces to be substantially upright along the length thereof when suspended between its respective ends. Thus, the band means could be made of woven plastic material. In such a case, the conveyor belt could suitably be made of the same brand of material as said band means.

Alternatively, the band means could be made of flexible sheet metal or non-woven plastic material.

In a further alternative, the band means is suitably of the chain conveyor type made of an array of interlinked, articulated members.

The said protrusion means is suitably located along the direction of the span of the band means.

Preferred, but non-limitative embodiments of the present invention, are now to be described in the description below with reference to the attached drawing figures.

FIG. 1 is a perspective end view of a first embodiment of the system according to the present invention.

FIG. 2 is a top plan, schematic view of a slight modification of the embodiment of FIG. 1, thus constituting a second embodiment of the invention.

FIG. 3 is a top plan view of a third embodiment of the system according to the invention.

Figure 4:
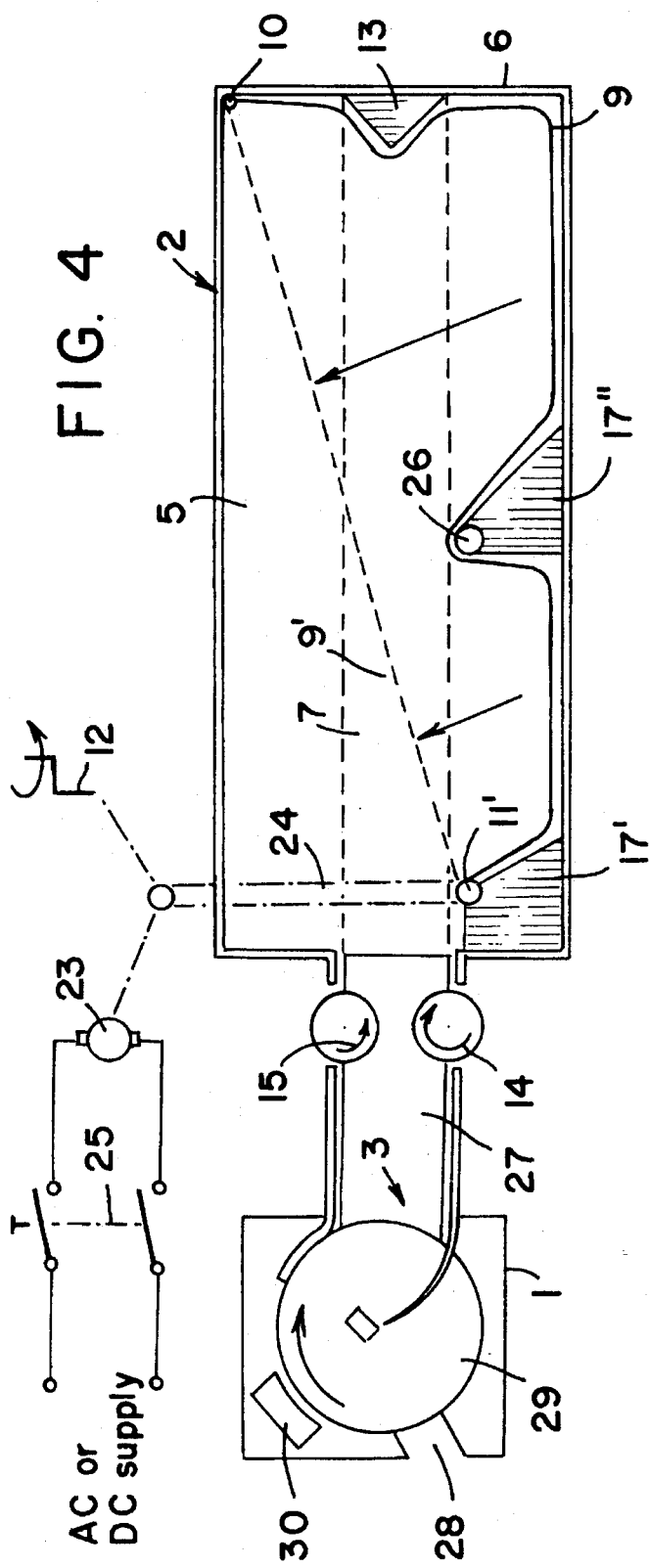
FIG. 4 is a fourth top plan view in a schematic form of the system according to the invention.
Figure 5:
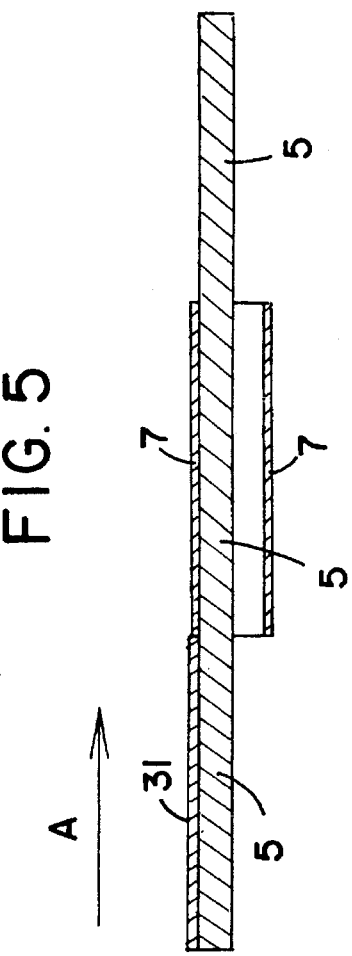
FIG. 5 is a schematic representation of a cross section of the collection table with conveyor end and elevated table section, according to the invention.

FIG. 1 shows a reverse vending machine 1 for empty liquid containers, such as empty beverage bottles, and a container collection table 2 operatively connected with an outlet 3 from said machine 1 for collecting containers put into the machine by a customer and delivered out from the machine. Suitably, said table 2 has a table surface 5 and fence or wall means 6 along the circumference of the table. A conveyor belt 7 is provided in the longitudinal direction of the table surface 5 to move liquid containers from the outlet 3 of the machine 1 onto the collection table 2. In a practical application of the table, the table is provided with legs 8 to locate the table surface 5 at a distance from a floor to present the table surface 5 at a proper work level for a person to be able to pick liquid containers from the table 2.

A person trying to retrieve liquid containers located along the opposite side of the table surface 5 may, however, have difficulty reaching such liquid containers without involving excessive bending and stretching of his/her back.

Therefore, in order to easily move liquid containers which are collected on the table 2 to one side of the table, there is provided band means 9, e.g. in the form of a woven or non-woven plastic material or flexible sheet metal.

The properties of the material used for said band means 9 should include an inherent rigidity which enables the faces of said band means 9 to be substantially upright along the length thereof when suspended between its end points.

At one end of said band means 9, said end is secured at an attachment point 10 to one longitudinal side region of the table 2. Roller means 11 is provided in an upright position at another longitudinal side region of said table for receiving the other end of said band means 9. An actuating means 12, e.g. in the form of a crank shown in FIG. 1 or a motor as shown in FIG. 4, is operatively connected with the roller 11 for winding or unwinding the end portion of said band means 9 onto or from the roller means, respectively.

Thus, in the winding mode of said actuating means 12, the containers are shifted substantially transversely of said table 2 to one side thereof due to the band means 9 being tensioned.

In the unwinding mode, the band means 9 is released from any action of the actuating means and is therefore gradually pushed by containers 4 delivered onto said table so that the band means 9 finally lies substantially along the inner borderline of the table 2.

If the actuating means is motor driven, then when the motor comes to a halt, free wheel means may be present for disengaging the motor to enable the band means return to its nominal state along at least two walls 6 of the table 2. Thus, when power on the actuating means 12, 12' or 23' is removed, the band means will gradually return to said nominal position.

At the end of the conveyor, there is normally located a triangular member 13 overlying the end portion of the conveyor 7 and the table surface 5 at the end thereof, the purpose of the triangular member 13 being to divert liquid containers to either side when they reach the end region of the conveyor belt 7 and thus the end region of the table surface 5.

The diverting member 13 should also be provided in the case of no conveyor belt being present in operation with the table 2. In such case, push out means 14, 15, as will be further explained in connection with FIG. 4, are suitably provided to push liquid containers onto the collection table.

In the embodiment of FIG. 2, it is noted that the end attachment point of the band means 9 is at the start end of the table 2. It is seen that in the unwinding mode, the band means 9 is gradually pushed against the inner boundary 6 of the table 2 by means of the liquid containers fed onto the table 2. Upon movement of the actuating member 12 and the corresponding actuation of the roller 11, the band means 9 becomes stretched between the attachment 10 and the roller 11, thus moving the liquid containers 4 across the table surface 5 closer to the position of a person 15 who is to pick up liquid containers, here denoted by 4' for relocation in smaller collection units, such as crates. By this arrangement, the person 16 will no longer have to bend and stretch extensively in order to reach the liquid containers which have been collected on the surface 5 of the table 2.

The conveyor belt 7 is suitably an endless conveyor belt, e.g. made of a woven plastic material.

However, provided that suitable space is available in the conveyor table surface 5, the conveyor belt 7 could be of the chain belt conveyor type made of an array of interlinked, articulated members.

In FIG. 3 there is shown a further embodiment of the present invention in which at least at one position along the inner borderline of the table there is provided protrusion means 17 extending into a container collection region on said table 2. The protrusion means 17 has a substantially triangle shape in horizontal cross section. In the FIG. 3 embodiment there is provided a band means 9 and a bay band means 18 in a collection bay on said table 2 located between said protrusion means and an end region 19 of the table 2. On FIG. 3, the bay is denoted by reference numeral 20. As explained in connection with FIG. 2, when the band means 9 is partly rolled onto roller 11, said band means 9 becomes stretched between an attachment point 21 at the apex of said protrusion means 17 and the roller 11. Thus, bottles which are adjacent the band means 9 will be moved across the table surface 5. In view of the protrusion means 17 being provided, in the example shown, approximately midway along the longitudinal length of the table 2, liquid containers may assemble in the collection bay 20. Therefore, it would be advantageous to be able to move liquid containers out of such collection bay 20 in order that they may subsequently reach the end of the table 2 and be moved towards the person 16 by means of the band means 9. Therefore, a further roller 22 is provided to move the bay band means to a stretched position at which liquid containers collected at said bay 20 may be moved out from the bay and to the region of the conveyor 7 to be moved to the very end of the table 2. The roller 22 as well as the roller 11 may be operable by means of a crank and/or motor means respectively.

In the embodiment of FIG. 4, it is seen that the roller corresponding to roller 11 in FIGS. 1–9 is labelled as 11'. Further, the roller 11' is located at a protrusion means 17'. The roller 11' is operable by crank 12' or motor 23 via mechanical power transfer means 24, e.g. in the form of a chain cooperating with sprockets at either end thereof. The motor 29 is operable from an AC or DC supply via switch means 25. In the embodiment shown, in FIG. 4, there has been included a further protrusion means 17" having at the free apex thereof a freely rotatable roller 26 to ease the movement of the band means 9 over the protrusion means 17".

Thus, when either the crank 12' or the motor 23 is operated, the roller 11' will start to wind the band means 9 onto the roller 11' and thus, the band means 9 will be tensioned between the roller 11' and an attachment point 10' at the approximately diagonally located corner of said table 2.

Thus, liquid containers collected between the unwound position of the band means 9 (shown in solid line) and the position of the band means denoted by 9' will be effectively pushed across the table surface 5 towards the opposite longitudinal side of the table 2 in the winding mode of said band means 9.

Although a conveyor belt 7 may be preferable for efficient transport of liquid containers onto a table 2, the conveyor belt could be deleted altogether or be supplemented by push out means 14, 15, e.g. in the form of a pair of push out rollers made of a resilient material and with suitable surface friction, said push out rollers rotating in opposite directions as indicated on FIG. 4, thereby capable of pushing liquid containers fed out from the machine 1 onto the surface 5 of the table 2. Conveyor means 27, either horizontal or vertical, connecting the machine 1 with the table 2, may be provided.

Suitably, the reverse vending machine has a container inlet 28, container movement means, e.g. a rotating disk 29 within the machine and means 30 within the machine for recognizing physical properties of a container being transported through the machine 1 from the inlet 28 thereof to the outlet 3 thereof in order to assign e.g. a redemption value to the liquid container.

Unless the upstream side of the path of movement of a liquid container across the table 2 is flush with slightly higher than the level of the conveyor belt 7 and the down stream side of said path, there a strong likelihood that liquid container may engage the longitudinal edge of the conveyor 7 and thereby be caused to tilt or overturn. Thus, and with reference to FIG. 5, in order to avoid such tilting or overturning of a liquid container movable in the direction of arrow A, the upstream side of said path is provided with a table surface 31 which is above the ordinary table surface 5 and has an upper level which is either flush with or slightly above the upper level of the conveyor 7. As will be readily understood, the upper level of the conveyor belt 7 will be slightly above the upper level of the table surface 5.

Although preferred, non-limitative embodiments of the present invention have been shown and described, the expert in the art will readily appreciate that many modifications and variations of the presented embodiments can be visualized within the spirit and scope of the present invention. Thus, the number of protrusion means could be any which is different from that shown and described in the present specification. Also, multiple container collection bays could be provided, each with a separate collection bay band means or with a common collection bay means. In a modification of the embodiment of FIG. 4, the roller 26 could e.g. be power driven through further power transfer means connecting the roller 26 with the crank 12' or motor 23. However, in the form shown in FIG. 4, the roller 26 provides a sliding and supporting surface for the band means in connection with the protrusion means 17".

As indicated, the band means could be made of woven plastic material. Suitably, the conveyor belt could be made of the same brand of material as the band means. This implies that the band means could even be made of a slightly worn-out conveyor belt material. In a further alternative, the band means could be of a chain conveyor type made of an array of interlinked, articulated members, in which case the roller means 11, 11' and/or 22 suitably should include a sprocket drive. With such a type of band means, it could in some applications be difficult to provide the band means wound about a roller means, and a roller means would in such case rather act as a transfer means to collect the free end portion of the band means and subsequently feed it to a collection box 32, as indicated in FIG. 3.

The present invention provides an efficient, cheap and simple way of moving liquid containers, such as bottles of glass or plastic material or cans across a collection table substantially transversely of the direction of which said liquid containers are initially supplied to the collection table. The improvement, according to the invention requires relatively moderate mechanical forces, either provided through manual movement of the actuating means, such as said crank, or said electric motor means.

An even more important aspect of the invention is that the improvement, according to the invention may be applicable to already existing collection tables, which subsequent to relatively minor modifications will be operable according to the system of the present invention.

Having described my invention, I claim:

1. In a system that includes a reverse vending machine for empty liquid containers, such as empty beverage bottles, and a container collection table operatively connected with an outlet from said machine for collecting containers put into said machine by a customer and delivered out from said machine, and the table being provided with an endless conveyor belt with opposite longitudinal sides extending in a longitudinal direction of the table, and the table having two longitudinal surface regions arranged such that one of the longitudinal surface regions is provided alongside one of the longitudinal sides of the conveyor belt, and the other longitudinal surface region is provided alongside the other longitudinal side of the conveyor belt, and the table having a periphery, the improvement comprising a band means extendable across each of the longitudinal surface regions of said table, said band means having opposite end portions and being longitudinally flexible and having an inherent lateral rigidity to permit said band means to be positioned substantially upright laterally with respect to the longitudinal surface regions of the table along the length of said band means, one end of said band means in said laterally upright position being secured to said table proximate one of said longitudinal surface regions, roller means being provided at said other longitudinal surface region for receiving the opposite end portion of the band means in said laterally upright position, actuating means operatively connected with said roller means for winding or unwinding said opposite end portion of said band means onto or from said roller means, said band means having a first extended slack length disposable on said table when said band means is unwound a predetermined amount from said roller means, said roller means reducing the amount of the first extended slack length on said table when said actuating means is actuated to wind the roller means, whereby in a wound mode said band means is wound to take up the slack of the first extended slack length to tension the band means and cause movement of said containers on said table transversely of said table from one of said longitudinal surface regions to the other of said longitudinal surface regions, and whereby in the unwound mode said band means has the first extended slack length on said table to permit gradual movement of said band means to a peripheral portion of said table by engagement of the first extended slack length of said band means with a growing accumulation of containers delivered onto said table from the reverse vending machine.

2. The system according to claim 1 wherein said table is provided with protrusion means at at least one position along the periphery of said table, said protrusion means extending from said periphery onto the surface of said table.

3. The system according to claim 1, wherein said table at one or more positions along said inner borderline is provided with protrusion means extending into a container collection region on said table.

4. The system according to claim 2, wherein said protrusion means has a substantially triangular horizontal cross section.

5. The system according to claim 2, wherein said roller means is located at said protrusion means.

6. The system according to claim 2, wherein said protrusion means includes a sliding and supporting surface for said band means.

7. The system according to claim 3, wherein a container collection bay is provided between adjacent protrusion means, a bay band means being provided therebetween and movable from a position where it follows the bay walls and upon shortening thereof to a position extending over the mouth of the bay.

8. The system according to claim 3, wherein a container collection bay is provided between a protrusion means and a wall portion of said table, a bay band means being provided therebetween and movable from a position where it follows the bay walls and upon shortening thereof to a position extending over the mouth of the bay.

9. The system according to claim 1, wherein said actuating means is an electric motor.

10. The system according to claim 1, wherein said actuating means is a manually operable crank.

11. The system according to claim 2, wherein the level of said table along one longitudinal side of said conveyor belt is flush with or slightly higher than the upper surface of said belt, and higher than the level along the other longitudinal side of said belt.

12. The system according to claim 1, wherein the band means is made of a woven plastic material.

13. The system according to claim 1, wherein the band means is made of flexible sheet metal or non-woven plastic material.

14. The system according to claim 2, wherein said protrusion means is located along the direction of the span of said band means.

15. The system according to claim 1, wherein said band means is of the chain conveyor type made of an array of interlinked, articulated members.

16. The system according to claim 2, wherein at least two of said protrusion means are provided at the periphery of said table in spaced relationship such that the space between said protrusion means defines a container collection bay having a mouth, said band means being positionable against each of said protrusion means and along the periphery of said table between each of said protrusion means when said band means is in the unwound mode, said band means being positionable across each of said protrusion means at the mouth of said container collection bay when said band means is in the wound mode.

17. The system according to claim 2 wherein the periphery of said table includes a border structure and a container collection bay having a mouth is defined between said protrusion means and a section of said border structure, a portion of said band means being positionable against said protrusion means and against said section of border structure when said band means is in the unwound mode, said band means being positionable across the mouth of said container collection bay when said band means is wound from the unwound mode to the wound mode.

18. The system according to claim 1 wherein said conveyor belt has an upper surface and one of the longitudinal surface regions has a surface level that is at least flush with the upper surface of said conveyor belt and the other said longitudinal surface region has a surface level that is no higher than the upper surface of said conveyor belt.

19. The system according to claim 18, wherein said conveyor belt is made of a same brand of material as said band means.

* * * * *